United States Patent
Bonomi et al.

[11] Patent Number: 5,838,681
[45] Date of Patent: Nov. 17, 1998

[54] DYNAMIC ALLOCATION OF PORT BANDWIDTH IN HIGH SPEED PACKET-SWITCHED DIGITAL SWITCHING SYSTEMS

[76] Inventors: Flavio Bonomi, 526 Lowell Ave., Palo Alto, Calif. 94301; Kent H. Headrick, 35266 Severn Dr., Newark, Calif. 94560; Amit Shah, 880 Bremerton Dr., Sunnyvale, Calif. 94087

[21] Appl. No.: 590,970

[22] Filed: Jan. 24, 1996

[51] Int. Cl.⁶ .................................................. H04L 12/56
[52] U.S. Cl. ............................................ 370/395; 370/477
[58] Field of Search ...................................... 370/229, 230, 370/232, 231, 234, 235, 236, 237, 389, 387, 388, 391, 392, 394, 395, 396, 397, 404, 405, 401, 408, 429, 477, 475, 535, 902, 905, 912

[56] References Cited

U.S. PATENT DOCUMENTS 5,325,356   6/1994   Lyles ........................................ 370/411
5,511,070   4/1996   Lyles ........................................ 370/411

*Primary Examiner*—Dang Ton
*Attorney, Agent, or Firm*—Gray Cary; Ware & Freidenrich

[57] ABSTRACT

A system and method for routing data between input and output ports in an ATM node of a packet-switched network allocates port capacity in accordance with the requirements of the users connected to the ports. Capacity may be allocated either dynamically in real time, according to a fixed predetermined schedule, or according to certain characteristics of the data awaiting transfer between users, such as the length or type of data. The system and method optimize the utilization of system resources by enabling ports having a physical capacity which substantially exceeds the capacity of a conventional ATM switch to be interconnected for data transfer.

35 Claims, 11 Drawing Sheets

DYNAMIC ALLOCATION OF PORT BANDWIDTH IN HIGH SPEED PACKET-SWITCHED DIGITAL SWITCHING SYSTEMS

BACKGROUND OF THE INVENTION

The present invention relates generally to systems and methods for cross connecting high speed packet-switched digital signals such as in an asynchronous transfer mode (ATM) telecommunications network or ethernet packet-switched system, and more particularly to a new and improved architecture for an ATM switching system capable of the dynamic and flexible allocation of switch bandwidth across the switch ports.

The current cross-connect technologies and architectures for high speed packet-switched digital signals, such as ATM and ethernet switches, have a significant disadvantage in that they inflexibly allocate the aggregate switch capacity (C) or bandwidth, to the number (N) of ports of a given maximum capacity which the switch can support. Thus, for a switch supporting ports which all each have a capacity or bandwidth of (B), the number of ports which the switch can support is (N=C/B). Each physical switch port is allocated a share of the aggregate switch capacity corresponding to the maximum physical transmission rate capability of that particular port, and the capacities allocated to corresponding ingress and egress ports are always the same. Moreover, the telecommunications industry has adopted a relatively small set of standard transmission rates. For ATM systems, these are 1.5 Mbps, 2 Mbps, 25 Mbps, 34 Mbps, 45 Mbps, 52 Mbps, 155 Mbps, and 622 Mbps. Ethernet systems have similar large granularity between standard transmission rates. These standard rates are the result of a historical evolution in wide area network technologies, rather than being dictated by any practical, terminal or application requirements, and transmission hardware is designed to operate at these standard rates. As can be seen, there are large intervals between the standard rates, and migration from one rate to another typically requires replacing transmission hardware (e.g., network adapters, switch ports, and possibly cabling) with hardware capable of the new higher rate. This may require a large capital investment. There is no graceful way to upgrade. If one were to buy higher capacity network cards than needed, the extra capacity would be wasted.

Additionally, if a particular port, i.e., user, has a requirement for a particular maximum port capacity or rate, even if this maximum capacity is required for only a small percent of the time, it is necessary to allocate to that port a portion of the switch capacity corresponding to a standard capacity or transmission rate sufficient to accommodate the maximum requirement, despite the fact that for a majority of the time the user may require a capacity which could be accommodated by a lower standard capacity. This results in wasted switch capacity and inefficient utilization of switch resources. The inability to flexibly allocate switch capacity to ports also has other significant disadvantages. For example, if all the core switch capacity is allocated in the traditional way to a number of ports, it is difficult to add a new user. Either one or more switch ports must be shared across multiple users by adding an external multiplexer to accommodate the new user, or another switch must be purchased and interconnected in tandem with the first switch by trunks. This is accomplished by connecting one of the input ports and one of the output ports of the first switch to output and input ports, respectively, of the new switch, and moving both the user which was connected to that port and the new user to the new switch. This, however, results in a rather ungraceful and possibly uneconomical growth pattern for the network because of the additional equipment. It also raises the possibility of blocking because two or more ports cannot simultaneously access the two ports in the new switch because there is a single trunk line connecting the switches. To avoid blocking, it is necessary to increase the number of trunks connecting the switches with the consequent wasteful allocation of switch resources.

Another disadvantage of current switch architectures is that the switch capacity is allocated to ports symmetrically, i.e., the ingress rate to a switch port from a given user is the same as the egress rate from the switch back to the user. This can result in wasted capacity. For example, in client-server configurations, a data base server has a much different requirement for output data rates than for input data rates. The server typically receives data requests via the network from clients as a number of relatively small messages, which necessitates only a relatively small port capacity to the server. However, the server typically transmits very large files to the requesting ports, which requires a substantially larger capacity. In order to accommodate this larger capacity, because the switch is symmetrical, the port capacity to the server must be made the same as that from the server, which results in an inefficient and wasteful use of switch egress capacity.

The disadvantages of current architectures may be summarized as follows. The need for a larger number of ports into the switch is automatically reflected in a need for a higher aggregate core switch bandwidth, even where there is a large portion of unused switch core bandwidth, or requires the use of lower capacity ports. There is no ability to flexibly, dynamically and asymmetrically share nonutilized switch core resources at a port level. Core switch bandwidth is allocated on a fixed basis for all ports at the maximum supported by the port, with ingress bandwidth equal to egress bandwidth in a symmetric fashion, and unused capacity at a port is wasted. Migration to a higher port bandwidth necessitates replacing equipment, and evolution toward higher bandwidth can only occur in relatively large jumps or intervals unrelated to the actual application and/or terminal equipment requirements and capabilities. And, there is inefficiency in growth with fixed size modules.

It is desirable to provide system architectures and methods which avoid these and other problems of current cross connect technologies, and it is to these ends that the present invention is directed.

SUMMARY OF THE INVENTION

The invention provides system architectures and methods for cross connecting high speed packet-switch digital signals, as in an ATM or switched ethernet network, which affords flexible and dynamic allocation of port capacity or bandwidth in a manner which results in an efficient utilization of switch capacity, minimizes wasted capacity, substantially increases the number of ports which the switch can accommodate without increasing switch capacity, and enables the dynamic allocation of bandwidth on demand to individual ports, on an asymmetrical basis if desired. The invention provides the ability to control, using software, network adapters which generate packets or data cells to provide an appropriate rate which is not greater than a given value for a physical port. The rate at which cells are sent to the port by the adapter is limited to the maximum value which the port can physically support. At any given period of time, however, the rate allocated to that port may be set in time between zero (0) and the maximum rate depending upon the requirements of the user connected to the port. Moreover, in accordance with the invention, switch capacity can be allocated with small granularity across multiple ports in a way that maximizes the number of ports connected to the switch and efficiently utilizes the internal switch fabric capacity, while providing sufficient bandwidth to each port to accommodate the needs of that port. An important feature of the invention is that, for any given bandwidth allocation, across the active ports of the overall switch, the resulting switch architecture is fully non-blocking. This means that available egress bandwidth at any output port can be allocated to any virtual connection entering the switch from any input port, once sufficient ingress bandwidth is available at the considered input port.

The invention employs multiplexing, demultiplexing and routing subsystems connected between the external switch ports and the internal ports of a conventional switching core fabric. These subsystems consolidate traffic from multiple input ports into high rate streams which are routed through possibly multiple alternate paths within the subsystems and submitted to the switching fabric via available internal ports. The subsystems further route traffic exiting the switch fabric through the appropriate internal output ports to the external output ports through possibly multiple alternate paths, and control the rate of traffic provided to each external output port in accordance with the capacity requirements of the output ports on a real time basis. The invention may manage the port bandwidth allocation of the switch according to a predetermined schedule, according to characteristics of the data such as data type and amount of data to be transferred, or according to requests from network adapters for bandwidth, by determining the permissibility of the required bandwidth, and controlling the elements of the cross connect system to effect the desired port bandwidth allocation.

In one aspect, the invention provides a system for cross connecting users in a packet-switched network in which a node, to which users are connected via input and output ports, routes data between users. Adapters at each user which interface the user to the network are controlled so that each port is allocated a portion of the maximum capacity at which data can be routed through the node such that the aggregate data rates of the ports does not exceed the maximum capacity.

In another aspect, the invention provides a system for cross connecting users in a packet-switched network which includes a switch for routing data from any input port to one or more output ports, and the ports are each allocated a portion of the maximum capacity of the switch in response to the data rate requirements of users connected to the ports such that the aggregate data rates of the ports does not exceed the maximum capacity of the switch.

In yet another aspect, the invention provides a method of routing data between users in a packet-switched network which includes a switch for routing data from any input port to one or more output ports where the data rates allocated through each port are controlled to provide a rate corresponding to a portion of the maximum capacity of the switch so that the aggregate data rates of the ports do not exceed the switch maximum capacity.

In accordance with more specific aspects, port capacity may be allocated flexibly and dynamically in real time in order to accommodate the data rate requirements of the users. Port capacity may also be allocated to a fixed schedule, or in response to certain predetermined characteristics of the data awaiting transfer between users, such as the type of data or the amount of data to be transferred. Other aspects of the invention will become apparent from the description as follows.

DESCRIPTION OF THE PREFERRED EMBODIMENTS

The present invention is particularly applicable to high speed packet switched ATM telecommunication networks and systems, and will be described in that context. However, it will be appreciated from the description which follows that the invention has broader utility to other more general types of digital switching systems such as ethernet or token ring switches, or cross-connect systems.

Figure 1:
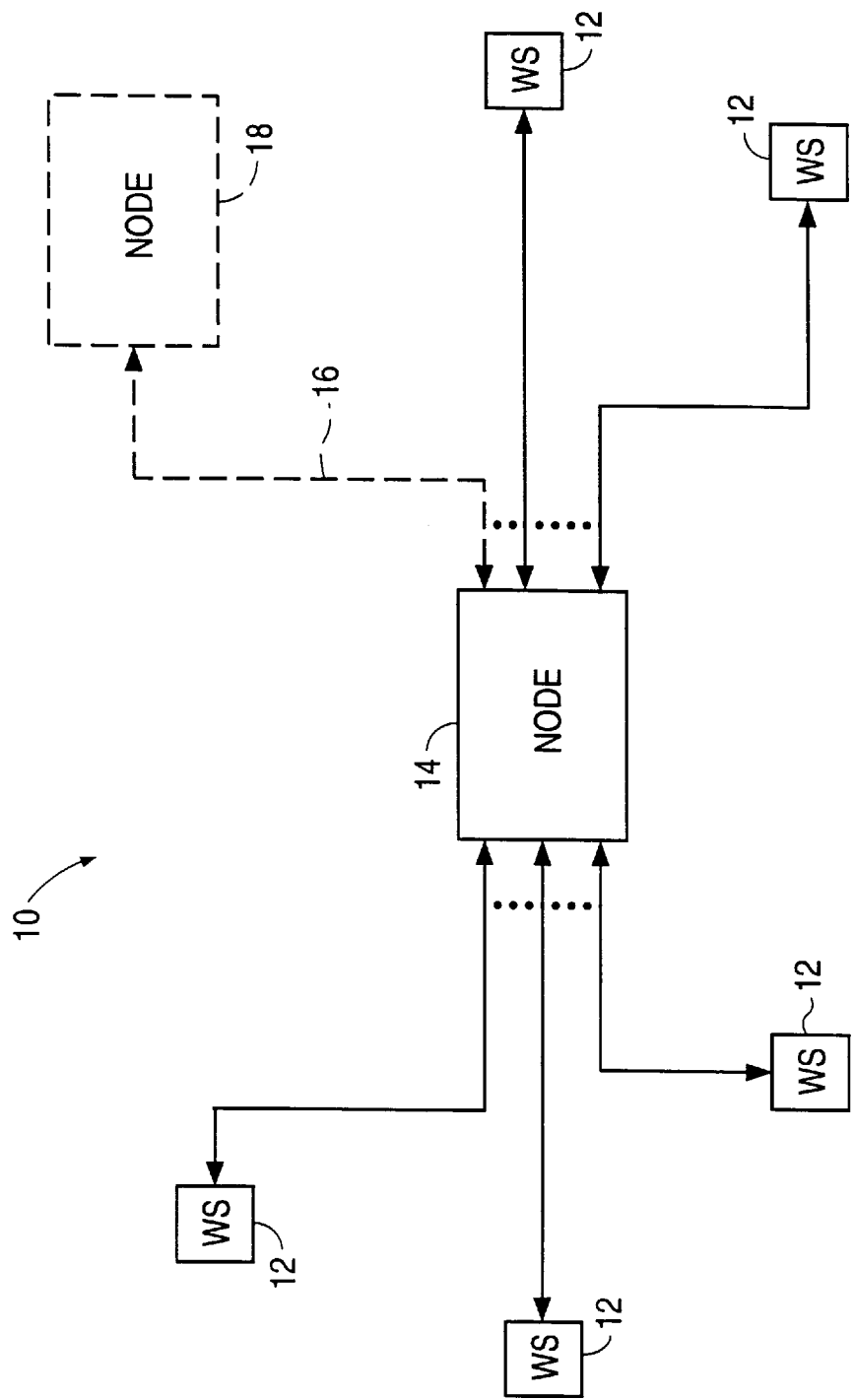
FIG. 1 is a block diagram of a telecommunications network employing a high speed packet switch of the type with which the invention may be employed.

FIG. 1 illustrates a workgroup 10 of the type with which the invention may be employed. As shown, the workgroup may comprise a plurality of workstations, hosts or other users 12 which are interconnected by a node 14 to form a telecommunications network. (As used herein, "user" refers to a computer such as a workstation, a server etc. or even another node connected to an external port rather than to virtual channels which are passed through a given port.) Node 14 is functionally a switch which permits any workstation of the network to be interconnected to and communicate with any one or more workstations of the network. Node 14 may also have a connection 16 to another node 18 which may be part of network 10, part of another network, or part of a wide area network that interconnects many different networks, stations, and services.

Network 10 may be an asynchronous transfer mode (ATM) packet-switched telecommunications system in which data is transferred between users in a packet-switched manner by means of data packets. The packets comprise groups of digital words that include the data or information being conveyed as well as a header which provides control and address information for the packet. Node 14 employs the header information to deliver a packet from one workstation 12 to one or more of the other workstations or to the remote node 18. Nodes permit data packets to be delivered simultaneously, i.e., multicast, to a plurality of different destinations. Workstations 12 may comprise computers, digital telephony or video systems, or systems which generate other kinds of digital information.

The solid lines connecting each workstation 12 and node 14 in FIG. 1 with the double-ended arrows on each line indicate a physical connection path between each workstation and the node. As will be described in more detail shortly, each physical path between a workstation and the node may comprise separate lines, one supplying data cells to the node from the workstation and connected to an external ingress port of the node, and another line supplying data cells to the workstation from addition, there may be port of the node. In addition, there may be a plurality of virtual connections between each workstation and multiple different destinations within the network for transferring data between the workstation and the multiple destinations. As will also be described shortly, each workstation has a network adapter which interfaces the workstation to the physical path connecting the workstation with the node. These adapters may be controlled to provide different data rates for the plurality of virtual connections. In accordance with the invention, the adapters are controlled to control the aggregate rate of all virtual connections to match actual data rate requirements of the user up to the maximum physical bandwidth of the external port.

Figure 2:
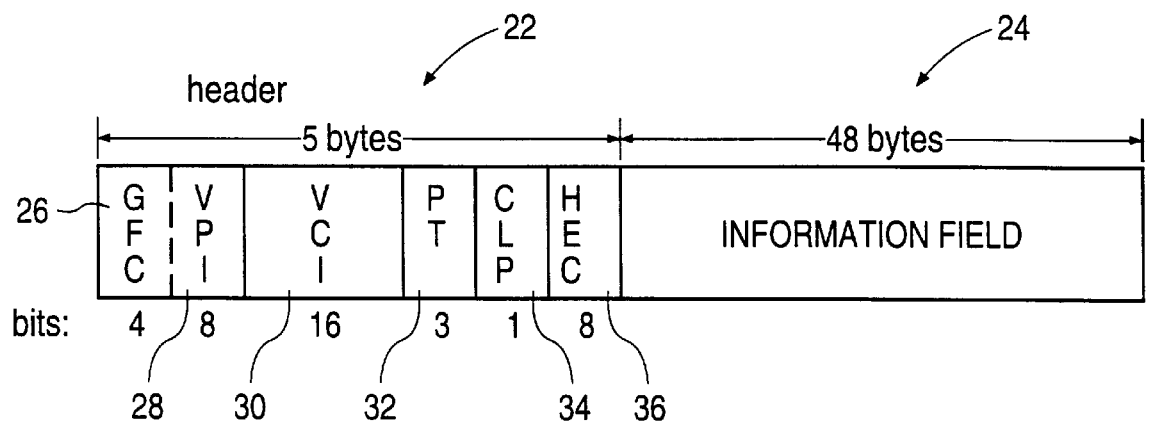
FIG. 2 is an illustration of the structure of a standard ATM cell of the type which may be employed in the network of FIG. 1.

In ATM systems, the basic data packet employed in a cell. FIG. 2 illustrates the structure of one form of a standard ATM cell. As shown, the standard ATM cell is 53 bytes wide. Each byte comprises an 8-bit word or octet. The cell includes a 5-byte header portion 22 and a 48-byte information field 24. Header portion 22 comprises a plurality of different fields that contain control and routing information for the cell. These include a 4-bit wide generic flow control (GFC) field 26 (which may be omitted), an 8-bit wide virtual path identifier (VPI) field 28, a 16-bit wide virtual channel identifier (VCI) field 30, a 3-bit payload type (PT) field 32, a 1-bit cell loss priority (CLP) field 34, and an 8-bit header error control (HEC) field 36. The GFC field may not be used, in which case the VPI field is extended to 12 bits. If used, it provides a mechanism for flow control among multiple user terminals connected to a shared access link. The VPI field is used to identify the virtual path between consecutive nodes in the network. The VCI field identifies the virtual channel of the data flow through the node. The PT field distinguishes between cells containing data information and network information, e.g., congestion control information. The CLP field allows a 2-level loss priority to be specified explicitly for individual cells. This determines the priority at which the cell will be discarded in the event congestion within the network occurs which necessitates loss of cells. The field is useful for insuring that high priority data is not corrupted by having cells containing its information dropped. Finally, the HEC field stores cyclic redundancy check data for error protection of the cell header.

Figure 3:
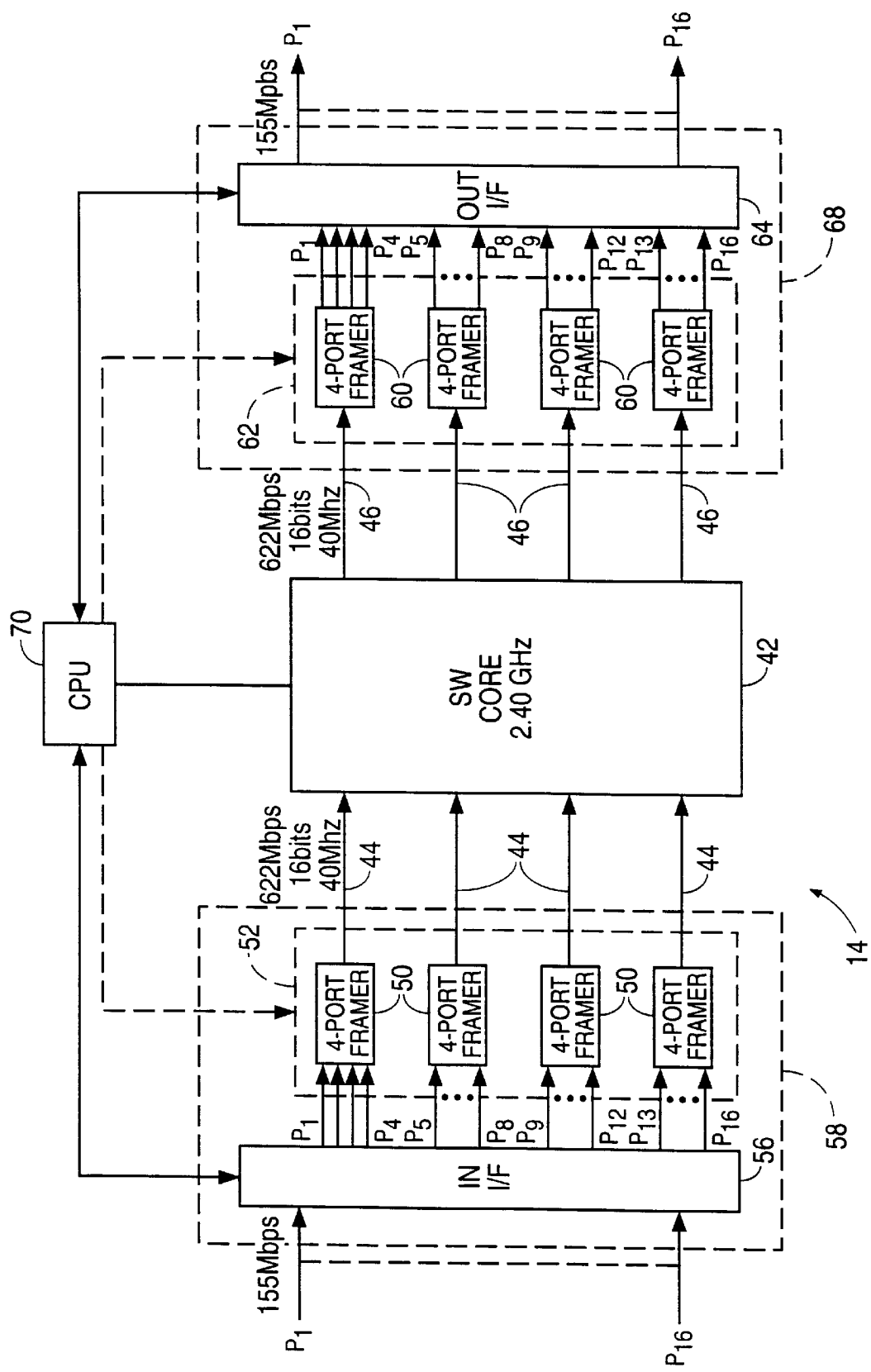
FIG. 3 is a block diagram illustrating a node of the type conventionally employed in the network of FIG. 1.

FIG. 3 is a block diagram illustrating the structure of one embodiment of a conventional node 14 which may be employed in the network 10 of FIG. 1. As shown, node 14 contains a central cross-connect or switching core fabric 42 which, as will be explained, buffers and routes data cells through the node. For the particular embodiment shown in FIG. 3, cells may be received at the switch core on one of four high speed input data buses 44, and may be output on one of four output data buses 46 according to the destination of the cell. Each input bus 44 and output bus 46, as well as the switch core, may operate with a standard 16-bit parallel data format at a 40 Mhz rate, for an effective information rate of 622 Mbps. This gives an effective aggregate information rate of 4×622Mbps=2.4 Gbps for the switch. Switch core 42 and node 14 thus operate effectively at a capacity or bandwidth of 2.4 Gbps. The 622 Mbps data streams can handle cells from different numbers of physical external ports. For example, one 622 Mbps data bus may correspond to one 622 Mbps external port, or four 155 Mbps ports, or twenty-four 25 Mbps ports, etc.

For the embodiment of FIG. 3, each input data bus 44 is supplied to the switch core from a corresponding 4-port framer module 50, which is part of an input framer subsystem 52. Each framer, thus, corresponds to four 155 Mbps ports. The four 4-port framers 50 are connected to an input interface subsystem 56 which provides physical external port interfaces for connection to the various workstations 12 of the local area network or to other nodes 18. The input interface subsystem may comprise transceivers (not shown) for each external input port of the node. The transceivers interface with either optical fibers or twisted pair copper wire connections to the input ports, and convert the serial optical or electrical data signals at the external input ports into corresponding serial electrical signals. The input framer subsystem 52 and input interface subsystem 56 together constitute an input subsystem 58. a 2.4 Gbps switch core, the external input ports to the node are scalable between 4 physical ports operating at 622 Mbps to 16 physical ports operating at 155 Mbps to 96 physical ports operating at 25 Mbps, etc. The switch core disassembles the cells into header and data portions, and generates internal header tags to track and route the cells through the node. Depending upon the data rate at the input ports, the input interface subsystem combines and supplies a predetermined number of external ports to each of the framers 50 of the input framer subsystem 52. For a port data rate of 155 Mbps, four ports at 155 Mbps are supplied to each framer. The framers convert the input serial data from the four ports into the 16-bit wide parallel 40 Mhz, 622 Mbps, data format which is output on the data buses 44 to the switch core.

Although FIG. 3 illustrates an embodiment in which all input ports and all output ports have the same capacity (155 Mbps), it is not necessary that all ports be the same. Port capacities may be mixed. If desired, a 155 Mbps input port, and its corresponding output port, may be replaced with six 25 Mbps ports, with three 45 Mbps ports, or with some combination totaling an aggregate capacity of 155 Mbps. In this case, either additional multiplexing hardware would be required at the 4-port framers for these ports, or the framers themselves would have to be modified to accept and combine a different number of ports. Similarly, instead of 16×16 155 Mbps ports, the node may be configured with 96×96 25 Mbps ports, or with some different combinations of port capacities. Likewise, four 155 Mbps ports may be eliminated (along with the corresponding framer) and replaced with one 622 Mbps port. Once allocated, however, the capacity of each port is fixed and cannot be changed without physically reworking the port hardware. Also, there is exactly one path followed by all cells from a given input port in order to reach the core switching fabric. Thus, there is a fixed, hardwired association of an external port of the switch to an internal core fabric port.

At the output of the switch core 42, the translation and conversion process is reversed. Output buses 46 supply the 16-bit parallel, 40 Mhz data streams to corresponding framers 60 in an output framer subsystem 62. Each output framer 60 may also handle four ports. They convert the parallel data to serial 155 Mbps data for each of the four ports, and supply the data to an output interface subsystem 64. The output interface subsystem also includes transceivers which afford a physical interface for each of the external output ports. The output framer subsystem 62 and output interface subsystem 64 together constitute an output subsystem 68.

The operations and functions of node 14 are controlled by a central processing unit (CPU) 70 as indicated in FIG. 3. As ATM cells enter the node, the header information is read and internal header tags are generated for the cells to route them and track them through the switch core. As noted earlier, the node is essentially a switching fabric which routes cells from the external input ports to appropriate external output ports. CPU 70 controls the switch core to effect the desired routing.

As noted, a disadvantage of the node and switch fabric shown in FIG. 3 is that the input and output ports are allocated a fixed bandwidth equal to the physical data rate capacity of the port, and, moreover, the input and output bandwidths are allocated symmetrically. The maximum capacity of the input and output ports is fixed by physical hardware and design. For a standard node configuration such as illustrated in FIG. 3, the external port capacity may be 155 Mbps, for example, and the aggregate bandwidth or capacity of the node is 2.4 Gbps. Each external port represents a physical connection to a workstation, to a host, or to another node. Accordingly, there is a fixed allocation of bandwidth to each port. If a particular user is inactive or is not sending or receiving data at the full capacity of its port, then the unused bandwidth allocated to that port is essentially lost. As a result, the node operates inefficiently at less than its full capacity. Moreover, if all ports of the node are allocated to users, it becomes very difficult to add a new user. Either another switch core must be purchased for the node and interconnected in tandem with the first switch core by trunks, or one of the existing ports must be reworked to share its port capacity with the new user, as by adding an external multiplexer. Adding a second switch to accommodate the new port is not only costly, but it also results in a blocking configuration. To connect the two switches by trunks, an input and output port on the first switch must be used as a trunk. This requires that the users originally corresponding to these ports be reallocated to the new switch along with the new user. Blocking results in this configuration because the single trunk lines do not offer sufficient capacity between the two ports on the new switch and those on the original switch. Similarly, reworking existing ports on the switch so that a port shares its capacity with the new user is also disadvantageous. This permanently downgrades the corresponding workstation's capacity and requires additional hardware and controls to enable the new user to be multiplexed into the physical port with the downgraded workstation.

The present invention avoids these disadvantages by providing a switch architecture that affords a dynamic and flexible allocation of the total aggregate switch bandwidth across the ports of the switch, possibly on an asymmetrical basis, as will now be described.

Figure 4:
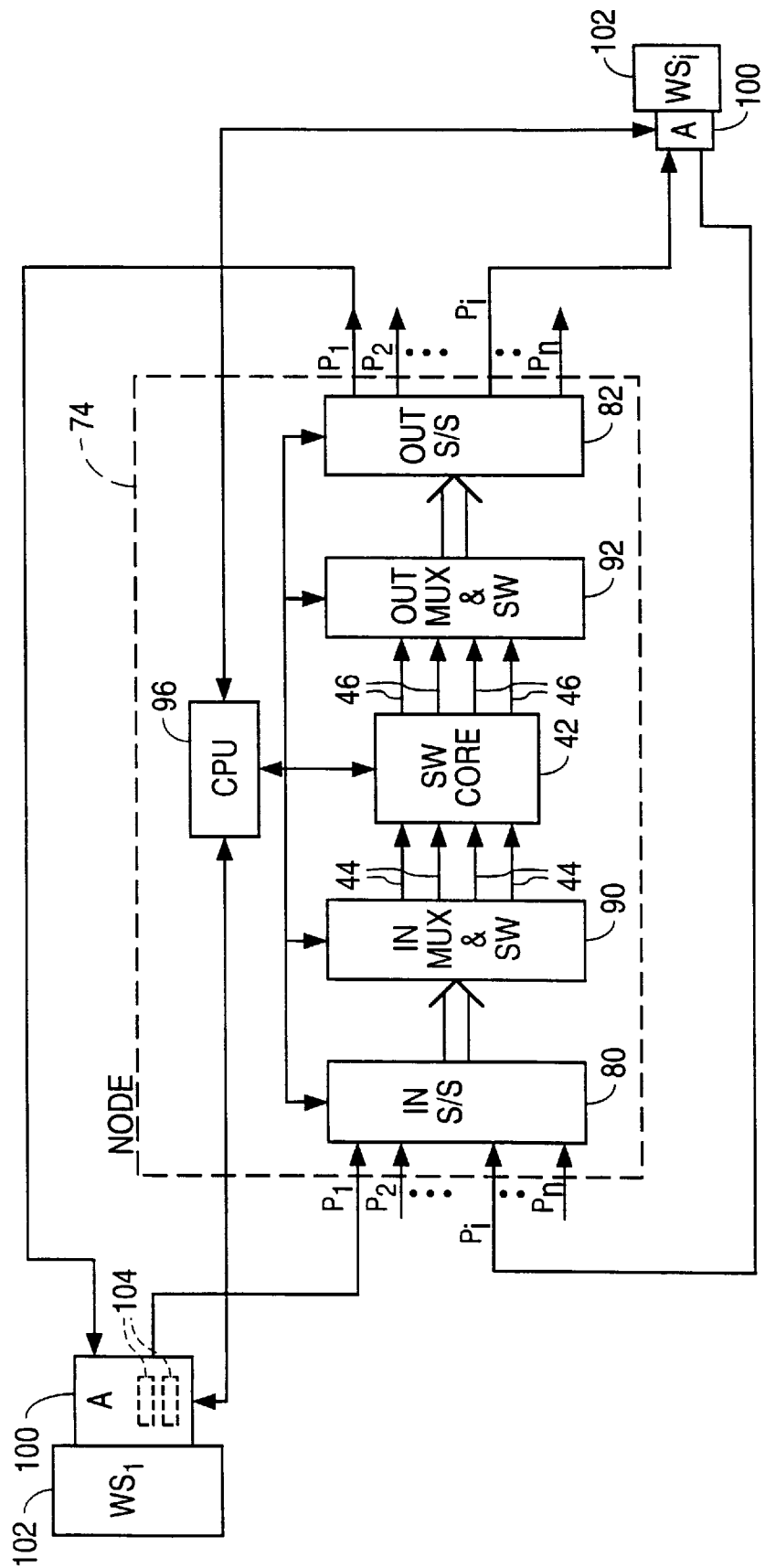
FIG. 4 is a block diagram illustrating a node in accordance with the invention.

FIG. 4 illustrates a node 74 embodying the invention. As shown, the node may comprise a standard 2.4 Gbps switch core 42 which receives four 622 Mbps data inputs on corresponding databuses 44, and outputs 622 Mbps data on each of the four output buses 46 as previously described. The node also includes an input subsystem 80 and an output subsystem 82. The input and output subsystems 80, 82 provide external input and output ports to the node for connection to workstations, hosts or other users within the network, and may be substantially similar to the input and output subsystems 58 and 68, respectively, of FIG. 3, except for the number of ports which they provide, as will be explained shortly. The input subsystem 80 converts the data on the input ports to parallel form, and supplies the data to an input multiplexing and switching subsystem 90, which will be described in more detail in connection with FIG. 5. The input multiplex and switching subsystem receives the parallel data from the input subsystem 80 and outputs the data on four 622 Mbps data buses 44 to the switch core 42. An output demultiplexing and switching subsystem 92 receives four 622 Mbps output data buses 46 from the switch core, demultiplexes the data, converts it to serial form, and supplies the data to the output subsystem 82, for routing to the appropriate output ports. The output demultiplexing and switching subsystem will be described in more detail in connection with FIG. 6.

The operation and functions of the various subsystems of node 74 are controlled by a central processing unit (CPU) 96, as will be described in more detail later.

In addition, as shown in FIG. 4, the CPU is connected to an adapter (A) 100 associated with each workstation or host 102 that is connected to a port of the node. The adapters provide a physical interface between the workstation and the optical fiber or twisted wire pair over which data is transmitted and received between the workstation and the node ports. The adapters determine the rates for each of the plurality of virtual connections from the workstation to the node. The adapters may provide queues 104 (as shown) for buffering data cells awaiting transfer to the node, and combine the data cells for the plurality of virtual connections from the workstation into a multiplexed serial data stream. They control the rates for the various virtual connections by the timing at which cells for a particular virtual connection are inserted into the data stream. The invention, however, is not concerned with controlling the virtual connection rate, but the actual physical data rate between the adapter and the port. The invention controls the aggregate rate at which data is transmitted from each workstation in accordance with the available unallocated capacity of the switch, up to the physical capacity of the external port as will be described.

In accordance with one embodiment of the invention, an adapter may, under the control of the CPU, limit the data rate at which data is transmitted to a particular port by inserting idle cells having a high priority into the data streams at a particular rate. Thus, the useful data rate at the particular port is the difference between the maximum physical rate of the port and the rate at which the idle cells of high priority are inserted.

In accordance with the invention, the adapters may simply be controlled by the CPU in order to provide a predetermined port capacity for a fixed period of time, e.g., an hour, a day, a week, etc., in accordance with the requirements of the user of a particular port. The system administrator may reallocate capacities as needed. This affords a flexible allocation of the total aggregate capacity of the switch among the external ports in accordance with their requirements up to the total aggregate capacity of the switch. While this represents a significant improvement over conventional nodes, the invention affords even greater improvements as will now be described.

In accordance with the invention, the total aggregate switch capacity of the node may be allocated according to a predetermined schedule, or dynamically and flexibly allocated to the node ports up to the total aggregate switch capacity on a real-time basis in accordance with the actual traffic demands, i.e., requirements of each port. The port requirements can be determined from certain preselected characteristics of the data awaiting transmission between the node and the ports, such as data type or data amount, as well as by explicit requests from the users connected to the ports. This may be accomplished in the following ways.

The adapters control the rates at which data is supplied to the physical paths connecting a workstation to the external port by controlling the timing at which cells are inserted into the serial data stream being transmitted to the port. Within an adapter, data cells awaiting transmission are maintained in queues. The lengths of the data cell queues for transmission to the port is a function of the traffic demands of the particular workstation. Therefore, by monitoring the queue lengths, the CPU may determine the bandwidth requirements for the port in real time, and control the adapter so that the data rate from the adapter corresponds to the actual rate necessary to satisfy the data rate requirements of the user.

The data rate requirements for a particular port may also be determined from the particular type of data awaiting transfer to the port. For example, data corresponding to graphical images or to large data files, such as from a data base, require substantially greater bandwidth than, for example, e-mail or request messages for data transfers. By determining the type of data awaiting transfer from a given user, the system is able to determine the data rate requirements for that user. Bandwidth may also be allocated to a port by responding to an explicit request for bandwidth from the user connected to that port. The request may be conveyed to the CPU by extending a standard line management protocol, such as, in the ATM case, the ATM Forum ILMI protocol, to include messages tailored to bandwidth requests.

The data rate from and to the adapter may be controlled in small increments so that the port capacity allocated to a port matches closely the actual data rate and traffic requirements for the corresponding adapter, rather than being set at the next higher "standard" transmission rate. This optimizes the use of switch capacity, and minimizes wasted capacity. Consequently, the invention enables the CPU to allocate switch capacity among the ports in accordance with their needs, as long as the total aggregate capacity of the switch core is not exceeded. Since the invention allows the rates of data flowing both into and out of a port to be controlled, this enables the number of ports, n, connected to the node to be increased as desired, and available switch capacity to be allocated dynamically and flexibly among the ports while ensuring that the total aggregate capacity of the switch is not exceeded. This results in a much more efficient and optimum use of switch resources. Because ports are not all active at the same time, and even when a port is active may have capacity requirements which vary greatly from time to time, statistically, at any instance of time, a given number of ports, n, may have an aggregate bandwidth (data rate) requirement which is substantially less than the aggregate physical capacity of the n ports. Thus, the invention, by dynamically allocating port capacity in real time, enables a standard capacity switch core to handle a substantially greater number of ports than otherwise would be possible.

Another significant advantage of the invention is that it permits an asymmetrical bandwidth allocation between corresponding input and output ports. This enables a different allocation of capacity between the input data to a port and the output rate at which cells are returned to the corresponding workstation. The return rate may also be varied in time, just as the input rate may be varied in time, in order to dynamically allocate output switch capacity to meet the requirements of output data to a particular user. The manner in which this is accomplished will be described in more detail shortly.

Figure 5:
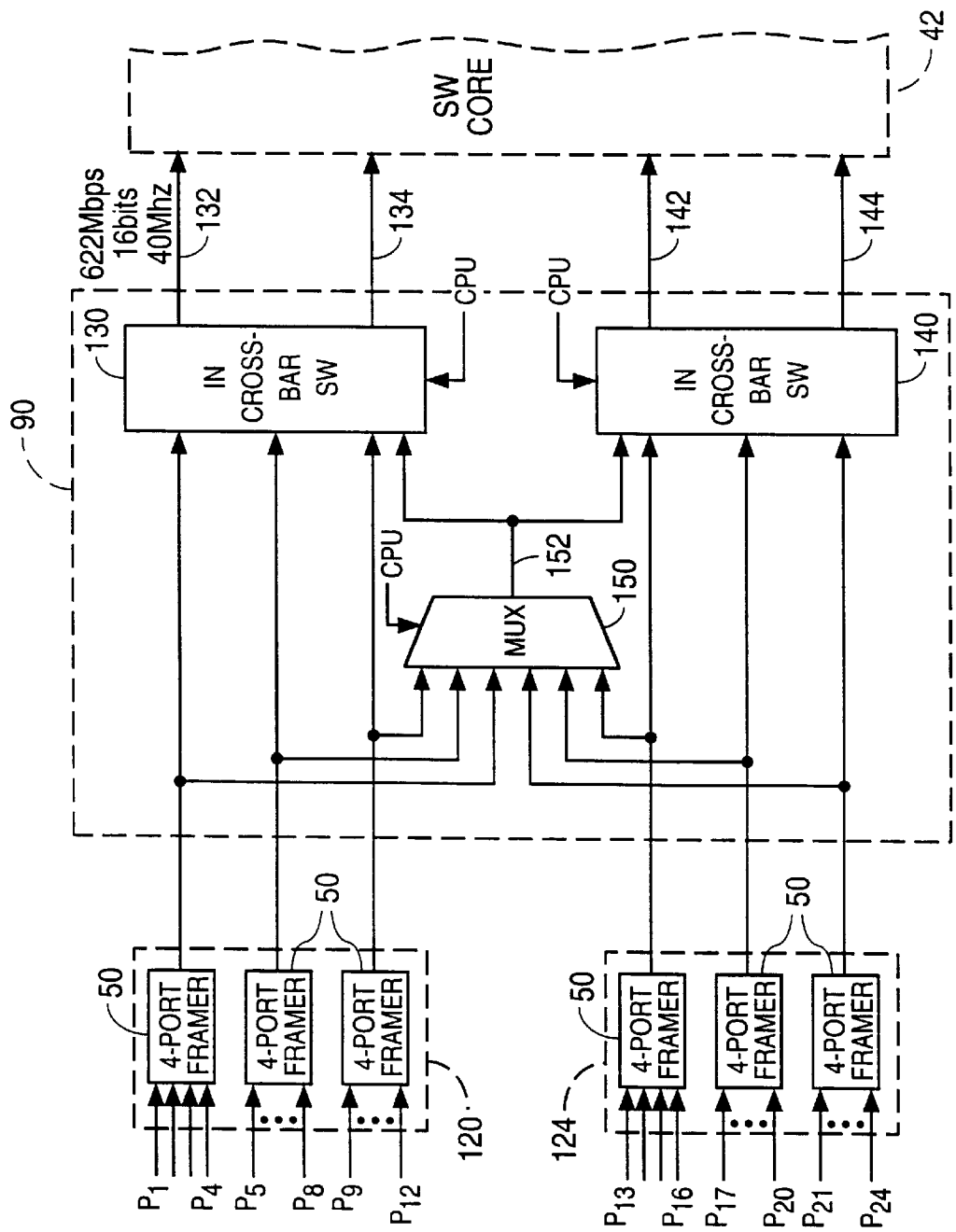
FIG. 5 is a block diagram illustrating an input multiplexing and switching subsystem of the node of FIG. 4.

FIG. 5 illustrates a preferred embodiment of the input multiplexing and switching subsystem 90 of the invention. As shown in the figure, the number of input ports may be increased from sixteen for the embodiment of the node shown in FIG. 3 to a much greater number, for example, twenty-four ports, as shown in FIG. 5. The ports are preferably implemented on multiple stacks, two such stacks 122 and 124, each containing twelve ports, being shown in the figure. Each stack may be a physical unit comprising three four-port framers 50 of the type illustrated in FIG. 3 and previously described. Each framer 50 may receive four 155 Mbps serial data streams from four external ports, and convert the four data streams into a 16 bit parallel, 40 Mhz (622 Mbps) output data stream, as previously described. The three framers of the first stack 122 may be connected to ports $P_1$–$P_4$, $P_5$–$P_8$, and $P_9$–$P_{12}$, respectively, as indicated. The 622 Mbps outputs from the framers 50 of the first stack 122 may be input to a first cross-bar switching element 130, as indicated. The cross-bar element outputs two 16-bit parallel, 40 Mhz (622 Mbps) data streams 132 and 134 to the switch core 42.

The three four-port framers 50 of the second stack 124 may be connected to ports $P_{13}$–$P_{16}$, $P_{17}$–$P_{20}$ and $P_{21}$–$P_{24}$, respectively, as indicated. The outputs of the framers 50 of the second stack 124 are supplied as inputs to a second cross-bar switching element 140 which, in turn, provides two 16-bit parallel, 40 Mhz (622 Mbps) output data streams 142 and 144 to the switch core. The input subsystem 80 (FIG. 4) may be similar to the input subsystem 56 of FIG. 3, but designed to accommodate the twenty-four ports input to the two stacks 122 and 124.

As indicated in FIG. 5, each of the outputs from the four-port framers of stacks 122 and 124 is also supplied as an input to a 6×1 multiplexer (MUX) 150. The output 152 of the multiplexer is split and supplied as a fourth input to each of the cross-bar elements 130 and 140, as indicated. The multiplexer, as will be described, multiplexes the input cells from different ports and at different rates (capacities) into a composite 16-bit parallel, 40 Mhz, 622 Mbps data stream. The multiplexer also records the input port of origin of every cell it receives, as by using, for example, part of the VPI field (see FIG. 2) in the cell header or using an added internal header field. The multiplexer and cross-bar elements are controlled by the CPU as indicated in the figure.

Figure 6:
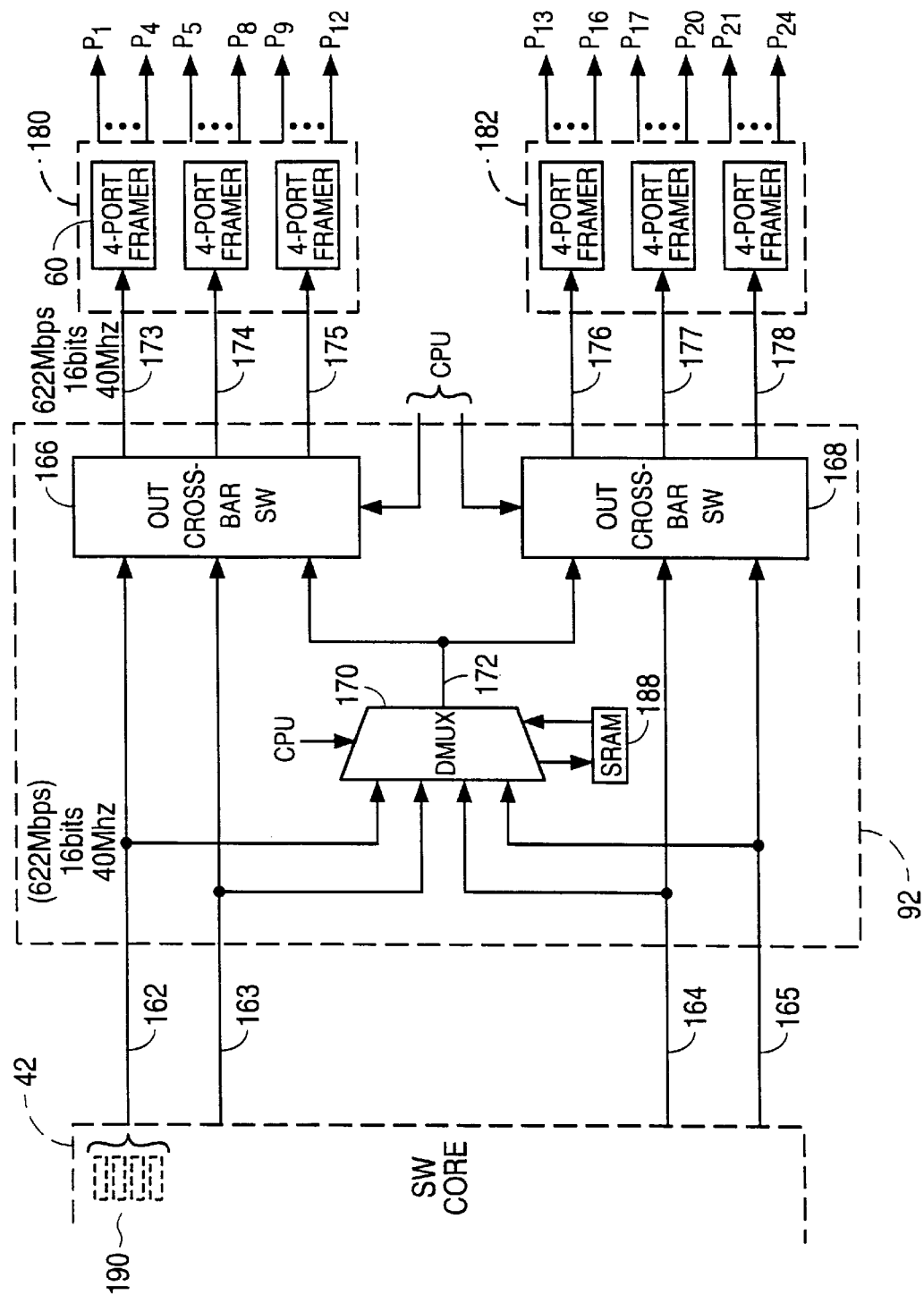
FIG. 6 is a block diagram illustrating an output demultiplexing and switching subsystem of the node of FIG. 4.

FIG. 6 illustrates a preferred embodiment of the output demultiplexing and switching subsystem 92 of the invention. The output demultiplexing and switching subsystem complements the input multiplexing and switching subsystem 90 of FIG. 5. The four 622 Mbps output data buses 162, 163, 164 and 165 from the core switch 42 are input, two each, to first and second output cross-bar elements 166 and 168, and are also input to a 4×1 demultiplexer (DMUX) 170 which has its output 172 split and supplied as another input to each of the output cross-bar elements 166 and 168, as shown. Cross-bar element 166 provides three 622 Mbps output buses 173–175 to respective four-port framers 60 in a first stack 180, and cross-bar element 168 provides three 622 Mbps output buses 176–178 to respective four port framers 60 in a second stack 182. Framers 60 may be substantially the same as those described in connection with FIG. 3. They convert each 622 Mbps 16-bit parallel, 40 Mbps data format to four 155 Mbps serial data streams for four ports of the node. As indicated in FIG. 6, the three framers 60 of stack 180 may be connected to output ports $P_1$–$P_4$, $P_5$–$P_8$, and $P_9$–$P_{12}$, respectively. Similarly, the framers 60 of stack 182 may be connected to output ports $P_{13}$–$P_{16}$, $P_{17}$–$P_{20}$, and $P_{21}$–$P_{24}$, respectively, as indicated.

An SRAM 188 may also be connected to DMUX 170 for local control and buffering and for storing internal tag information. The SRAM may include look-up tables to route cells in the output streams from the switch core into the right time slots of the DMUX output and control the data rates output to the adapters of each external port. Data cells destined for each of the output buses 162–165 may be queued in buffers in switch core 42, and read out of the buffers to form multiplexed data streams on each of the output buses. Each bus may have four buffers, one corresponding to each of four time slots in a frame (four such buffers 190 being shown in FIG. 6 for bus 162), and the data cells read from the buffers and inserted into the appropriate time slots in each data stream. This will be described more fully in connection with FIG. 9.

The framers 50 for the input ports in the input multiplexing and switching subsystem 90 of FIG. 5, and the framers 60 for the output ports in the output demultiplexing and switching subsystem 92 of FIG. 6 are preferably designed to support a full 155 Mbps data rate on each port. The cross-bar elements 130, 140, 166, and 168, as well as the multiplexer 150 and demultiplexer 170 are also preferably designed to support a full 622 Mbps data rate on each of its input buses. However, the six 622 Mbps data buses, if operated at their full capacity, are the equivalent to a bandwidth of 3.7 Gbps, which exceeds the 2.4 Gbps capacity of the standard switch core 42. Accordingly, it is apparent that the switch core cannot support twenty-four 155 Mbps ports operating at full capacity. Thus, capacity is flexibly allocated among the twenty-four external ports by CPU 96, as previously explained, such that the combined capacity of the ports does not exceed the total switch capacity of 2.4 Gbps. By designing each port to have its full bandwidth capacity, however, the invention is able to accommodate any capacity requirement of a port up to its maximum capacity of 155 Mbps. Thus, since, as shown in FIG. 5, each cross-bar element 130 and 140 supplies two 622 Mbps buses to the switch core, but has four input buses to it (three from each stack of the framers 50 and one from the multiplexer 150), the input data rates on each input bus to the cross-bar element must be controlled so that the total aggregate input data rate does not exceed the output capacity of the cross-bar element.

In order to facilitate the operation of multiplexer 150, which will be described shortly, the four-port framers 50 may be provided with one cell buffers on each input port, and the input cross-bar elements 130 and 140 may be provided with four cell buffers on each of the input lines from the framers. The buffers provide temporary storage for cells and facilitate the combining of cells into the data streams provided to the switch core.

Although the embodiment of the invention illustrated in FIGS. 5 and 6 assumes that each port has a capacity of 155 Mbps, as previously described in connection with FIG. 3, the capacities of the various input ports may be mixed and matched to provide different maximum physical capacities in order to accommodate a larger number of ports. This is particularly advantageous, for example, where the workstations may comprise terminal equipment, such as PCs, which have capacities substantially less than 155 Mbps. The invention is able to accommodate any number of external ports, and any combination of port capacities.

As noted earlier, CPU 96 controls the adapters 100 at each of the workstations which are connected to the input ports of the node in order to control the data rate into the input ports. Each adapter may be controlled so that its data rate is a fraction of the maximum physical capacity of the external port, 155 Mbps in the embodiment shown. Another function performed by the CPU 96 of the node 74 is to monitor the data rates coming from the adapters and to measure adapter congestion in order to permit reallocation of data rates. If, for example, the CPU sees a large queue in a host computer or a workstation having a large number of packets to be transmitted, the invention could allocate more bandwidth to that adapter dynamically if bandwidth is available. Since the CPU controls the allocation of bandwidth, it keeps track of the bandwidth allocated to each port and the total allocated bandwidth, and is able to intelligently reallocate bandwidth according to demands. The invention advantageously enables the data rate and thus the capacity of each input port to be controlled in increments as small as 1.5 Mbps by time division multiplexing the data cells from the users into multiplexed data streams supplied to the switch core. This is accomplished in the following way.

Figure 7:
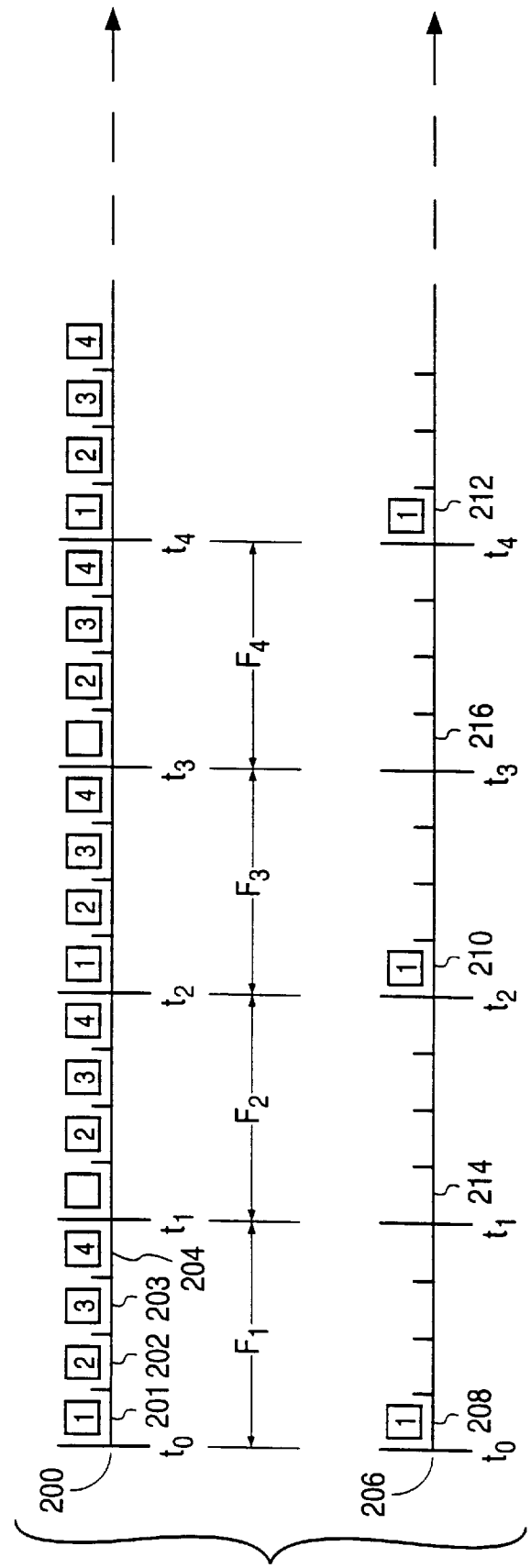
FIGS. 7, 8 and 9 are timing diagrams illustrating the manner in which the invention dynamically and flexibly allocates switch bandwidth among node ports.

Referring to FIG. 7, there is shown a timeline 200 which is segmented into successive frames $F_1$, $F_2$, $F_3$, etc. Frame $F_1$ extends from time $t_0$ to $t_1$; frame $F_2$ extends from $t_1$ to $t_2$; etc. Each frame is further subdivided into four intervals or time slots, each corresponding to one port. The timeline 200 represents the data rate on one of the 622 Mbps buses, such as output from one of the framers 50. Cells entering the four ports which constitute a given 622 Mbps stream are time division multiplexed into the four time slots of each frame. For example, if the timeline 200 corresponds to the 622 Mbps stream from the framer 50 connected to ports $P_1$–$P_4$ (FIG. 5), the cells from these four ports would be inserted into the same four time slots of each successive frame. This is illustrated by the blocks containing the numerals 1, 2, 3, and 4 in the figure. Thus, for frame $F_1$, the first time interval 201 contains a cell from port $P_1$; the second time interval 202 contains a cell from port $P_2$; the third time interval 203 contains a cell from port $P_3$; and the fourth time interval 204 contains a cell from port $P_4$. If each of the four ports were operating at 155 Mbps, then in frame $F_2$ and in each subsequent frame, cells from these four ports would be inserted into the respective first, second, third and fourth time slots, as shown, just as they were in frame $F_1$. If, however, it was desired to operate a port at ½ bandwidth, the data rate into that port would be cut in half, which would be accomplished by controlling the adapter to transmit cells to the port only one-half of the time. Thus, a cell from that port would be inserted into the appropriate time slot in every other frame, as indicated on the lower timeline 206 in FIG. 7 where it assumed that port $P_1$ is operating at half speed. As shown, cells from port $P_1$ would be inserted in the first time slot 201, 210, 212, etc. in every other frame $F_1F_3$, $F_5$, etc., and idle cells, e.g., no cells, would be inserted into the vacant first time slots 214, 216, etc. in the alternate frames $F_2$, $F_4$, etc. Thus, the data cells for port $P_1$ would be input at a rate of about 78 Mbps corresponding to one-half of the full port capacity of 155 Mbps.

Figure 8:
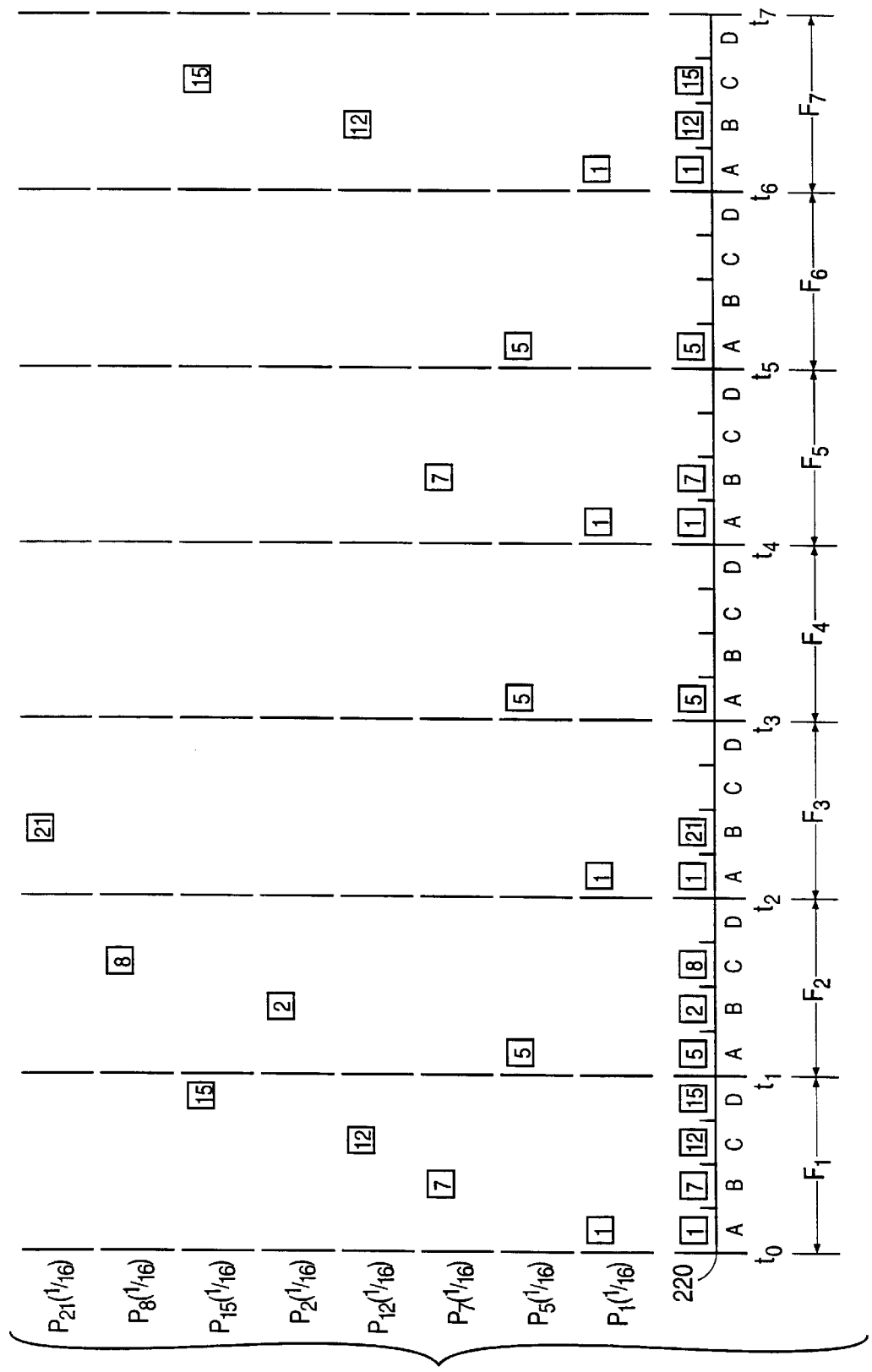

Similarly, in order to reduce the data rate of a port to ¼ of its maximum rate, cells would be inserted by the port adapter only every fourth frame. The adapter for the workstation corresponding to that port would be controlled by the CPU so that cells from that workstation would enter the port only one-fourth as fast and, preferably, at the appropriate times corresponding to every fourth frame. During the frames in which there are no data cells from that port, the unused time slots corresponding to that port's time position within the frames may be used for the cells from other ports, in effect time division multiplexing a number of ports into the same time slot position. This is accomplished by the input multiplexer. In this way, the total available bandwidth of the node can be allocated efficiently among the ports to enable the node to cross-connect a larger number of ports using a standard 2.4 Gbps switch than would be possible if all ports were operating at full capacity. This affords a significant improvement in port utilization of the node, and optimizes use of node resources. FIG. 8 illustrates this in more detail for a hypothetical case which is helpful to understanding the invention.

Referring to FIG. 8, a series of timelines are shown which correspond to a number of different ports. Each timeline indicates the frames into which cells from that port will be inserted in order to provide the cell data rate required to match the desired capacity of the port. Timeline 220 in FIG. 8 illustrates the cell composition of a composite 622 Mbps data stream for the example illustrated into which the cells from the ports are multiplexed by the input multiplexer 150 of FIG. 5. It is assumed in this example that ports $P_1$ and $P_5$ are to be allocated a bandwidth corresponding to ½ their maximum 155 Mbps capacity. Port $P_7$ is allocated ¼ of its maximum capacity, and ports $P_{12}$, $P_2$, $P_{15}$, $P_8$, and $P_{21}$, are all allocated ⅙ of their maximum capacity.

As shown, for port $P_1$, cells are transmitted during the first time interval A in every other frame $F_1$, $F_3$, $F_5$, etc. to provide a port bandwidth of ½×155 Mbps, or about 78 Mbps. Port $P_5$, which also has a data rate of ½, can have its cells inserted into the first unused time slots A of the even numbered frames $F_2$, $F_4$, $F_6$, etc., that would normally be occupied by the cells of port $P_1$ if it was allocated its full capacity. This is shown by the timeline $P_5$ (½). Therefore, by multiplexing the cells of the two ports into the same time slots in alternate frames, ports $P_1$ and $P_5$ are each allocated ½ of the maximum bandwidth of one 155 Mbps port, and the number of ports handled by the node is increased by one additional port.

Port $P_7$, which has a bandwidth allocation of ¼ of the port capacity, may have its cells inserted into the second time slot B of every fourth frame beginning, for example, in the second time slot B of frame $F_1$, as shown by timeline $P_7$ (¼). Thus, cells from $P_7$ will appear in frames $F_1$, $F_5$, etc.

Likewise, the ports allocated ⅙ bandwidth will have each of their cells inserted into time slots in every six frames. For example, port $P_{12}$ may insert cells into the third time slot C in frames $F_1$ and $F_7$, etc., port $P_2$ may insert cells into unused second time slot B in frames $F_2$, $F_8$, etc. Port P, may insert cells in the third time slot D of frame $F_2$ and then subsequently in the third time slot of every sixth frame. Likewise, port $P_{21}$ may utilize the second time slots B of frame $F_3$ and every sixth frame thereafter. The timeline 220 shows the resulting composite data streams and the cells inserted into each of the slots of the various frames.

Multiplexer 150 of the input multiplexing and switching subsystem 90 (FIG. 5) forms the composite multiplexed data stream by reading input data stream time slots and inserting the cells into the appropriate time slots of the successive frames of the composite data stream output at 152. The CPU 96 controls the adapters of the workstations to provide the required data rate and timing for the cells to arrive at the ports at the correct times for their assigned time slots.

The output 152 of the multiplexer 150 provides the composite data stream to each of the cross-bar elements 130 and 140. The data rates of the ports on the other input buses to the cross-bar elements which do not go through the multiplexer may be similarly controlled by the CPU 96 so that the total bandwidth allocated to the ports supplying each cross-bar element does not exceed ½ of the total bandwidth capacity of the switch core. The cross-bar elements do not perform any multiplexing function, but only associate input time slots to output time slots, thus achieving a purely routing function.

Another function of the multiplexer 150, under the control of the CPU, is to insert internal header information for routing purposes into the header of each cell. The VPI field (see FIG. 2) may be used for this purpose, and the field may be expanded to 12 bits by deleting the GFC field 26. The internal header may include the port number and the virtual connection identifier identifying a virtual connection for that port.

As noted earlier, the invention affords flexible asymmetrical port bandwidth allocation between input and output ports. Allocation of input port capacities is accomplished, as previously described, by controlling the physical data rate into the port by controlling the adapter connected to such port in accordance with the data rate requirements of the corresponding user. This may be determined, for example, by monitoring the queues of cells in the adapter, and controlling the adapter to provide the required data rate. Port capacity may also be allocated manually or under program control by the CPU according to a predetermined schedule. At the output side of the node, data can be returned to a given workstation from an external output port at a different rate than the rate at which data enters the node. This may be accomplished, for example, by monitoring the characteristic of the data stored in the queues in SRAM 188 as well as in the buffers of switch core 42 and allocating output port bandwidth to a particular port in accordance with the length of the queues or type of traffic for that particular port. The rate at which data cells are provided to an external output port determines the output port bandwidth, and this is under the control of the CPU. Since the CPU is monitoring and controlling the capacities of all output ports, it is able to allocate the total aggregate switch capacity among the ports in accordance with their needs. Moreover, since the CPU may monitor queue lengths of output data in real-time, it is able to dynamically allocate port bandwidth in accordance with actual traffic demands, thereby affording optimum port utilization. The adapters accept data at the rate provided to them by the port up to the maximum physical capacity of the adapter.

The output demultiplexing and switching subsystem 92, as well as the switch core 42 itself, both under the control of the CPU, allocate traffic to the output ports among the output data buses 162–165, and on output lines 173–175 and 176–178 from the cross-bar elements, in accordance with the bandwidth allocated for each external output port. The behavior of the various elements in the output demultiplexing and switching subsystem of FIGS. 4 and 6 is generally similar to that described for the input multiplexing and switching subsystems. The difference is principally in the behavior of the demultiplexer, which buffers cells in an external SRAM when rate adaptation to a given destination port rate is required. This may be best understood with reference to the example illustrated in FIG. 9.

Figure 9:
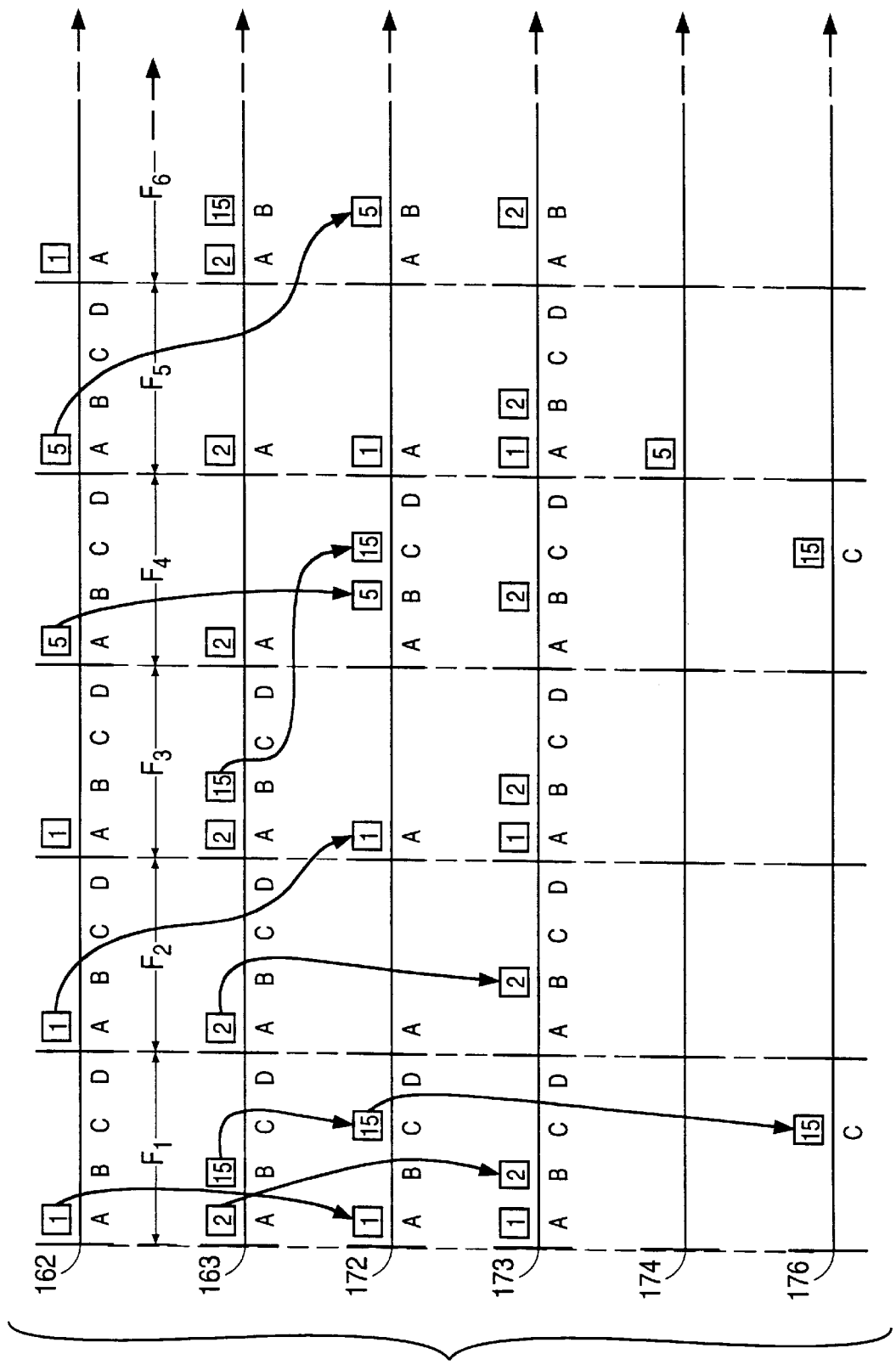

The example of FIG. 9 assumes that data cells destined for output ports $P_1$ and $P_5$ are to be allocated one-half of the external port capacity of their corresponding ports, port $P_2$ is to be allocated full capacity, and port $P_{15}$ is to be allocated one-third capacity.

FIG. 9 shows the timelines for the data streams on output buses 162 and 163, output bus 172 from the multiplexer 170, and the output buses 173, which supplies external output ports $P_1$–$P_4$, output 174 which supplies external output ports $P_5$–$P_8$, and output bus 176 which supplies output ports $P_{13}$–$P_{16}$. In the example, it is assumed that each of the output buses is a 622 Mbps bus which multiplex four 155 Mbps data streams, one corresponding to each of four internal fabric ports, into four time slots A–D in each frame F.

Data cells for ports $P_1$ and $P_5$ may be programmed to be routed by the switch core to the switch core buffers 190 (FIG. 6) which supply data cells to output bus 162. As shown in FIG. 9, the output data cells may statistically share the bandwidth corresponding to the first time slot A in each frame ($F_1$, $F_2$, . . . etc.). As shown, however, the data cells for each port are not necessarily supplied to output bus 162 in the same order as which they are supposed to appear at the output ports. As indicated, data cells for port $P_1$ may be inserted into the first time slot A of frames $F_1$–$F_3$, and $F_6$, while data cells for port $P_5$ may be inserted into the first time slot A in frames $F_4$ and $F_5$. Likewise, data cells for ports $P_2$ and $P_{15}$ may be multiplexed into the data streams on output bus 163. In the example illustrated, it is assumed that data cells for output port $P_2$ are inserted into the first time slot A in each consecutive frame, whereas cells for output port $P_{15}$ may be inserted, for example, into the second time slot B of frames $F_1$, $F_3$, and $F_6$.

The demultiplexing of the output data streams from the switch core and rate adaptation (or shaping) is performed by the output demultiplexer 170 which is programmed to monitor the output buses, read the content of the time slots carrying traffic destined for certain output ports which are usually less than full rate, and to multiplex the data cells for these ports into the output data stream on its output bus 172. The output data stream from the demultiplexer is supplied to output cross-bar elements 166 and 168, which route the data cells to the appropriate output destination ports. Thus, in the example shown, the output demultiplexer monitors the data stream on output bus 162, reads the cells destined for ports $P_1$ and time shifts and inserts the cells into its multiplexed output data stream 172 into the first time slot A of every other frame $F_1$, $F_3$, $F_5$, etc. Similarly, the demultiplexer may insert cells destined for output port $P_5$ which were in the first time slot of frames $F_4$ and $F_5$ on bus 162 into the second time slot B, for example, of frames $F_4$ and $F_6$, and alternate frames thereafter, of its output data stream 172. The demultiplexer likewise monitors the data stream on output bus 163, and reads and inserts data cells for output port $P_{15}$ into the third time slot C, for example, in every third frame beginning with frame $F_1$, as shown. The output demultiplexer must time shift and recombine cells destined to the different output ports onto its output bus 172 in the correct order so that they can be delivered to the appropriate external output ports by the cross-bar elements. The SRAM buffer of the demultiplexer stores the cells temporarily so that they can be time shifted into the correct time slots. As shown, output bus 173, which supplies the framer 60 connected to output ports $P_1$–$P_4$ has data cells destined for output port $P_1$ (which are at one-half rate) inserted into the first time slot A of every other frame, whereas cells destined for port $P_2$ (at full rate) do not go through the demultiplexer 170 but are inserted directly into the second time slot B of each frame on output bus 173. Likewise, data cells for port $P_5$ (also at one-half rate) will be inserted into the first time slot A of alternate frames beginning with frame $F_5$ in the data stream on output bus 174, and cells destined for port $P_{15}$ will be inserted into the third time slot C of every third frame beginning with frame $F_1$ in the data stream on output bus 176.

Thus from the foregoing, it can be seen that the architecture of the invention provides multiple flexible programmable paths between the internal switch output ports corresponding to time slots on output buses 162–165, and the physical external output ports $P_1$–$P_{24}$ of the node, and that the demultiplexer element 170 with its associated buffers in SRAM 188 provide flexible rate adaptation and control.

Other control activities performed by the CPU 96 include load balancing in order to optimize the bandwidth allocation among the ports. The input data buses 132, 134, 142 and 144 to the switch core (see FIG. 5) can be balanced so that they carry approximately the same data rates. For example, in FIG. 5 if it is assumed that ports $P_1$–$P_4$ operate at full bandwidth and therefore occupy fully one of the databuses 132 or 134 of the switch core, and that ports $P_5$–$P_8$ and $P_{10}$–$P_{11}$ are each operating at 100 Mbps, these combine to produce a capacity of 600 Mbps data stream output from multiplexer 150 to cross-bar switch 130. Thus, there is only 22 Mbps capacity left in the multiplexer to accommodate ports $P_9$ and $P_{12}$. Accordingly, if one of these ports requires greater capacity, the ports must be reallocated among the data streams, if possible, in order to provide the additional capacity.

For reliability and performance reasons, it may be desirable to provide one or more of the users with multiple adapters and to provide a second node in parallel with the first node in order to provide redundant data paths. This is particularly advantageous for servers, and this arrangement permits the total data rate into or out of a server to remain constant while providing reliability and redundancy. The invention, by controlling port bandwidths as described, enables a user to submit its traffic at a given aggregate rate through multiple adapters, which may be programmed to share the load in a balanced manner, or otherwise to take over the load of one or more adapters in the event of a port or switch failure.

Figure 10:
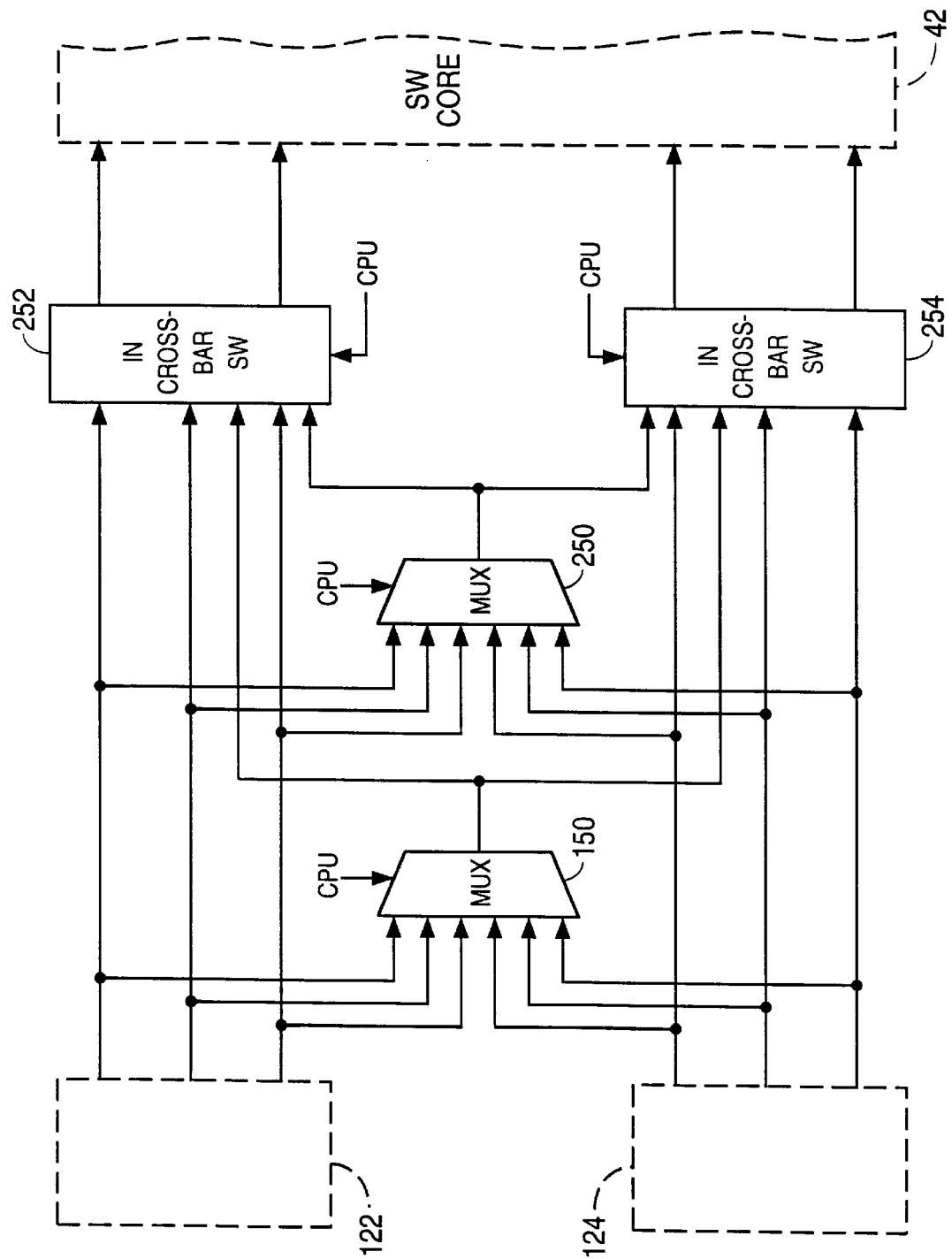
FIG. 10 is a block diagram of another embodiment of an input multiplexing and switching subsystem in accordance with the invention which may be employed in the node of FIG. 4.
Figure 11:
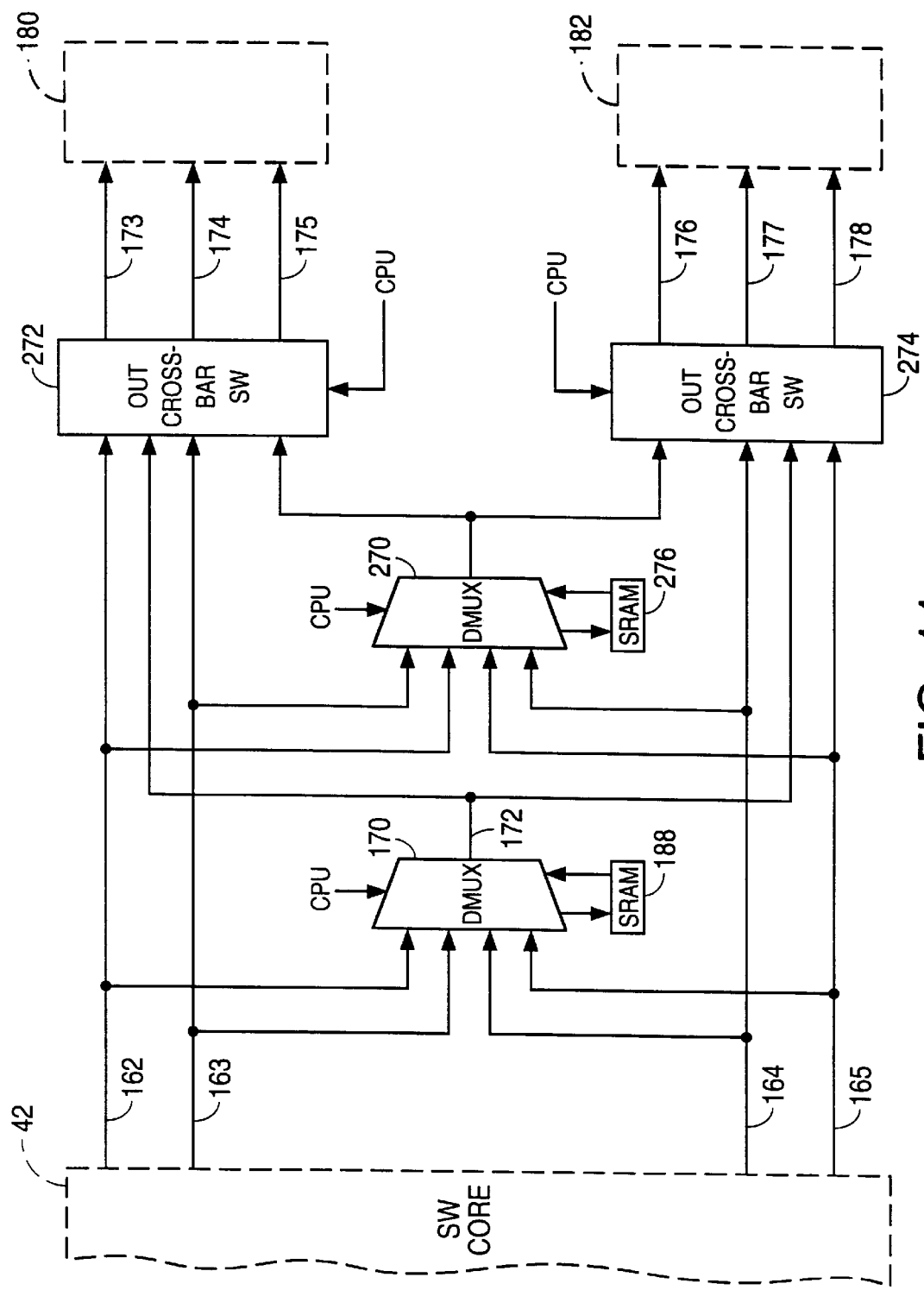
FIG. 11 is a block diagram of another embodiment of an output demultiplexing and switching subsystem in accordance with the invention which may be employed in the node of FIG. 4.

Alternative embodiments of the input multiplexing and switching and output the multiplexing and switching subsystems of FIGS. 5 and 6 are shown in FIGS. 10 and 11, respectively. These subsystems are used together in place of the subsystems of FIGS. 5 and 6. They afford greater flexibility, and facilitate and simplify switch capacity allocation among the ports and load balancing to the cross-bar elements.

As shown in FIG. 10, the input multiplexing and switching subsystem of FIG. 5 can be modified to include an additional multiplexer 250, and the input cross-bar elements 130, 140 are replaced with 5-input cross-bar elements 252 and 254 in order to accept the additional output data stream from the multiplexers 250. The additional multiplexer 250 effectively enables more bandwidth to be allocated in the manner described above, and simplifies load balancing since it provides greater flexibility in allocating the ports to the cross-bar elements and to the output data buses to the switch core.

The output demultiplexing and switching subsystem shown in FIG. 11 correspondingly includes an additional output demultiplexer 270, and also replaces the output cross-bar elements 166, 168 with four-input cross-bar elements 272 and 274, respectively. The additional input to each which is employed for the second demultiplexer 270. Additionally, the output demultiplexer 270 is provided with SRAM 276 which affords local buffering and control in a manner similar to SRAM 188.

From the foregoing, it can be seen that the invention affords significant advantages over currently available systems and methods for cross connecting high speed digital signals in a packet switch by enabling a dynamic, flexible and highly efficient allocation of switch and node capacity among a large number of external ports of the node. Since the invention is able to dynamically allocate (and reallocate as required) capacity to a port on demand and in real-time, the invention enables a significantly greater number of ports having a total aggregate capacity which substantially exceeds that of the switch to be handled by a conventional switch. Not only does this afford more efficient utilization of expensive resources, such as the switch itself, and eliminate the necessity for additional resources, it also provides easy expandability to accommodate additional ports without the necessity of extensive hardware reconfiguration. Moreover, the invention affords a totally non-blocking architecture for each chosen core bandwidth allocation to multiple output ports.

While the foregoing description has been with reference to particular embodiments, it will be appreciated by those skilled in the art that these embodiments may be changed without departing from the spirit and principles of the invention, the scope of which is defined by the appended claims.

We claim:

1. A system for cross connecting users in a packet-switched network comprising a node having a plurality of input and output ports for receiving data from and routing data to the users, the node having means for routing data from any user to one or more other users and having a maximum capacity at which data can be routed through the node, each port having a maximum data rate capacity, an actual transmission rate of data through the port, and an unused data rate capacity equal to the difference between the maximum data rate capacity and the actual transmission rate of the data; an adapter at each user for interfacing the user to the network, the adapter having means for transmitting data from each user to a corresponding input port and for receiving data from a corresponding output port; and control means for dynamically allocating the unused data rate capacity of the ports in response to the actual data rate requirements of the ports such that the aggregate data rates of the ports do not exceed said maximum capacity of the switch.

2. The system of claim 1, wherein said control means allocates data rates to the ports by controlling the adapters to control the rate at which data is transmitted to the input ports and by controlling the rate at which data is routed to the users from the output ports.

3. The system of claim 1, wherein the control means has means for allocating a data rate to a port in accordance with the requirements of the user of the port.

4. The system of claim 1, wherein the control means comprises programmable means for allocating data to the ports under program control in accordance with a predetermined schedule.

5. The system of claim 1, wherein the control means is connected to the adapters and allocates data rates to the ports in response to requests for capacity from the users.

6. The system of claim 1, wherein the control means comprises means for monitoring the data rate requirements of the users and for dynamically allocating port capacity in real time.

7. The system of claim 6, wherein the means for monitoring the data rate requirements of the users comprises means for determining a preselected characteristic of the data awaiting transmission between a user and the node, said preselected characteristic being one of data type or length of data, and for allocating port capacity according to said characteristic.

8. The system of claim 7, wherein data is transmitted as data cells between users and the node, and the means for monitoring comprises means for determining the lengths of queues of data cells awaiting transmission.

9. The system of claim 1, wherein the node comprises a switch having a plurality of input data buses for providing input data from the input ports to the switch, and a plurality of output data buses for providing output data from the switch for the output ports; an input multiplexing and switching subsystem disposed between the input ports and the input data buses for receiving input data and for multiplexing the data from different ones of the ports onto the input data buses; and an output demultiplexing and switching subsystem for receiving multiplexed data on the output buses of the switch and for demultiplexing and providing the data to appropriate output ports.

10. The system of claim 9, wherein the input multiplexing and switching subsystem comprises a multiplexer for receiving a plurality of data streams of data from the input ports and for providing an output multiplexed stream containing data from selected input ports; input cross-bar switching means for receiving the plurality of data streams and for receiving the output multiplexed stream from the multiplexer, the input cross-bar switching means providing said input data buses to the switch, and wherein the control means controls the multiplexer and the input cross-bar switching means to multiplex data onto appropriate ones of the input data buses to the switch in accordance with the data rates of the input ports.

11. The system of claim 10, wherein the output demultiplexing and switching subsystem comprises a demultiplexer connected to the output data buses from the switch for receiving multiplexed data from the switch and for providing an output data stream comprising data for selected ones of the output ports; output cross-bar switching means for receiving data on the output buses from the switch and for receiving the output from the demultiplexer, the output cross-bar switching means providing the data to the output ports of the node; and wherein the control means controls the demultiplexer and the output cross-bar switching means to allocate data to the output ports in accordance with a preselected characteristic of the data to each output port.

12. The system of claim 11, wherein the switch and the demultiplexer subsystem comprise buffers for storing data, and the control means controls the buffers to provide data to the demultiplexer and to the output cross-bar switching means.

13. A system for cross connecting users in a packet-switched network comprising a plurality of input and output ports for receiving data from and providing data to the users, each port having a maximum data rate capacity, an actual transmission rate of data through the port, and an unused data rate capacity equal to the difference between the maximum data rate capacity and the actual transmission rate of the data; a switch having means for routing data from an input port to one or more output ports, the switch having a maximum capacity at which data can be routed through the switch; and control means for controlling the switch to dynamically allocate the unused data rate capacity of the ports in response to the actual data rate requirements of users connected to the ports such that the aggregate data rates of the ports do not exceed said maximum capacity of the switch.

14. The system of claim 13, wherein the control means allocates capacity to the ports by controlling the rate at which data is transferred between the ports and the users.

15. The system of claim 14, wherein the control means comprises programmable means for controlling the data rates allocated to the ports under program control in accordance with a predetermined schedule.

16. The system of claim 14, wherein the control means has means for allocating data rates to the ports in response to requests from the users.

17. The system of claim 13, wherein the control means includes means for monitoring the data rate requirements of the ports, and means for allocating port capacity in real time in response to the data rate requirements.

18. The system of claim 13, wherein the control means includes for determining a preselected characteristic of the data awaiting transmission between users and ports, and means for allocating capacity to a port in relation to said characteristic of the data.

19. The system of claim 13, wherein said preselected characteristic comprises one type of data and length of data.

20. The system of claim 13, wherein the control means has means for controlling the rate at which data is transmitted to the input ports from each user and for controlling the rate at which data is transmitted from the output ports to each user, and wherein the control means allocates capacity to the input ports independently of allocating capacity to the output ports by independently controlling the input port data rate and the corresponding output port data rate.

21. The system of claim 13, wherein the switch has a plurality of input data buses for providing input data to the switch from the input ports, and a plurality of output data buses for providing data from the switch to the output ports; and wherein the system further comprises means for multiplexing data at the input ports into data streams and for supplying the data streams to the input data buses; and demultiplexing means disposed between the switch and the output ports for demultiplexing data on the output data buses and for providing the data to appropriate output ports.

22. The system of claim 21, further comprises input cross-bar switching means disposed between the input ports and the input data buses and controlled by the control means for combining data from the input ports into selected ones of the data streams for input to the switch; and output cross-bar switching means disposed between the output ports and the demultiplexer for routing data contained in the output data streams on the output data buses and from the demultiplexer to appropriate output ports.

23. The system of claim 22, further comprising buffering means in the switch and connected to the demultiplexer for temporarily storing data, and wherein the control means controls the buffering means to control the timing at which data is provided to the output data buses and to the output-bar switching means.

24. A method of routing data between users in a packet-switched network in which the users are connected to corresponding input and output ports of a node containing a switch having means for routing data from any input port to one or more output ports, each port having a maximum data rate capacity, an actual transmission rate of data through the port, and an unused data rate capacity equal to the difference between the maximum data rate capacity and the actual transmission rate of the data, the switch having a maximum capacity at which data can be routed through the switch, comprising determining the data rate requirements of users connected to the ports, and controlling the data rates at the ports to dynamically allocate the unused data rate capacity of the ports in response to the actual data rate requirements of a user connected to the port such that the aggregate data rates of the ports do not exceed said maximum capacity of the switch.

25. The method of claim 24, wherein said controlling comprises allocating port capacity in real time in response to said data rate requirements of the ports.

26. The method of claim 25, wherein the data has a predetermined set of characteristics, and wherein said controlling comprises allocating capacity to a port in relation to a preselected characteristic of the data awaiting transmission between such port and a user.

27. The method of claim 26, wherein said characteristics comprise one of type of data and length of data, and wherein said allocating comprises determining the preselected characteristic of the data for each port independently of other ports.

28. The method of claim 24, wherein said allocating to each port a data rate comprises allocating to an input port a data rate from a user connected to each port independently of the data rate allocated to a corresponding output port connected to such user.

29. The method of claim 24, wherein said allocating comprises allocating capacity to ports in accordance with a predetermined schedule.

30. The method of claim 24, wherein said allocating comprises allocating capacity to ports in response to requests from the ports.

31. The method of claim 24 further comprising multiplexing data at the input ports into a predetermined number of data streams and supplying the data streams to the switch, said multiplexing comprising combining the data at the input ports into said data streams in accordance with the data rate allocated to each input port; providing a predetermined number of output data streams from the switch, each data stream containing multiplexed data for the output ports, the data being dynamically allocated to the output data streams in accordance with the capacities allocated to the output ports; and demultiplexing the data streams and providing the data to appropriate output ports.

32. The method of claim 31, further comprising buffering output data in the switch and controlling the timing at which such data is accessed to form the output data streams; and wherein said multiplexing comprises selecting data in the data streams intended for certain output ports in accordance with the capacity allocated to such output ports.

33. The system of claim 3, wherein said data rate comprises a data rate having a plurality of different possible values.

34. The system of claim 16, wherein said data rate comprises a data rate having a plurality of different possible values.

35. The method of claim 25, wherein said data rate comprises a data rate having a plurality of different possible values.

* * * * *